US007454762B2

(12) United States Patent
Brake, Jr. et al.

(10) Patent No.: US 7,454,762 B2
(45) Date of Patent: Nov. 18, 2008

(54) METHOD AND COMPUTER PROGRAM PRODUCT FOR HANDLING APPLICATION REFERENCES TO UNDEFINED OPERATING SYSTEM SERVICES

(75) Inventors: Norman Edward Brake, Jr., Round Rock, TX (US); Donald Ray Stence, Pflugerville, TX (US); Marc Joel Stephenson, Austin, TX (US); Basu Vaidyanathan, Austin, TX (US)

(73) Assignee: International Business Machines Corporation, Armonk (JP)

( * ) Notice: Subject to any disclaimer, the term of this patent is extended or adjusted under 35 U.S.C. 154(b) by 615 days.

(21) Appl. No.: 11/006,199

(22) Filed: Dec. 7, 2004

(65) Prior Publication Data

US 2006/0123429 A1 Jun. 8, 2006

(51) Int. Cl.
*G06F 3/00* (2006.01)
*G06F 11/00* (2006.01)
(52) U.S. Cl. ........................................ 719/328; 714/38
(58) Field of Classification Search ................. 719/328; 714/38
See application file for complete search history.

(56) References Cited

U.S. PATENT DOCUMENTS 5,784,553 A * 7/1998 Kolawa et al. ............... 714/38
6,112,025 A * 8/2000 Mulchandani et al. ....... 719/331
6,366,876 B1 * 4/2002 Looney ......................... 703/25
6,779,187 B1 * 8/2004 Hammond ................... 719/331

OTHER PUBLICATIONS

Albot, et al, "Administration of Kernel Extensions," U.S. Appl. No. 10/920,904, filed on Aug. 18, 2004.

* cited by examiner

*Primary Examiner*—Meng-Ai An
*Assistant Examiner*—Lechi Truong
(74) *Attorney, Agent, or Firm*—Dillon & Yudell LLP

(57) ABSTRACT

A method and a computer program product that enable an existing operating system (OS) to provide a non-failure response to an application's reference to an OS service that is not currently defined/available within the existing OS. The loader of the OS responds to each reference to an undefined service by mapping the reference to an undefined service response utility (USRU). USRU is a specialized service designed to provide a response that a requested service is not yet available. When the OS loader detects that an application is referring to an OS service that is undefined, the OS loader resolves the reference to the USRU, which, when invoked returns an indication that the requested service is not yet available.

3 Claims, 3 Drawing Sheets

METHOD AND COMPUTER PROGRAM PRODUCT FOR HANDLING APPLICATION REFERENCES TO UNDEFINED OPERATING SYSTEM SERVICES

BACKGROUND OF THE INVENTION

1. Technical Field

The present invention relates generally to computer systems, and in particular to operating system (OS) services of a computer system. Still more particularly, the present invention relates to a method and system for handling requests for operating system (OS) services from an application.

2. Description of the Related Art

Most computer systems utilize an operating system (OS) to enable processing of application programs and to complete other general hardware/software functions. An OS provides a plurality of services/functions that reside within the OS kernel. These functions (or services) can be accessed via a reference generated by an application and issued to an OS library. The OS library provides a list of each OS function that may currently be available for access by an application.

The desire to continually improve and expand the OS leads to the OS developers/providers/programmers frequently creating new functions and/or upgrades (newer versions) to the existing functions. OS developers frequently introduce new capabilities into the OS kernel that can be referenced by an application. With conventional methods, these functions are often package in the next version/release of the OS. For these functions to be available within a computer system, the function name must be added to the OS library and a new OS kernel (encompassing the function) is required to be loaded on the computer system. Then, the computer system is restarted to invoke the new function.

Since the availability of the new OS may be several months or years away, most modern operating systems, particularly various versions of UNIX™, are designed with the capability to extend a base kernel through dynamically loadable and unloadable modules called "kernel extensions." These kernel extensions make use of kernel services, and in turn can provide services themselves. A kernel extension for a particular function has to be made available before an application can successfully reference the function. Thus, in order to allow an application to reference these newer/update functions while still using the current/older release of the OS, OS programmers typically have to write a kernel extension plus additional code to load the kernel extension onto the system and make the function available.

However, very often, the expanded library of functions lists the new/upgraded function before the function is provided within the current version of the OS, (i.e., the computer system's OS does not yet support the related underlying function listed within the OS library). Often, new libraries are provided for the current OS before the underlying functions can be made available. If an application references this function, a failure occurs. This failure may result in a restart of the OS. Such OS restarts are themselves problematic and not desired. Also, newer versions of applications may be designed to refer to services that are available only in a new version of the OS than currently exist on the computing device. In both scenarios, the application's request to reference the service fails and produces an error condition because the loader of the operating system cannot determine what service the request is referencing.

With the frequency at which new functions (or updates to existing functions) are generated, keeping an OS current with kernel extensions is a tedious and time consuming effort both in terms of designing these kernel extensions and associated code for loading the extensions and loading these extensions unto the computer systems. Certain programmers provide an indirect method for looking up the availability of a service. With the indirect method, an application is specially written to check for the availability of the service. The application then invokes the service indirectly, if the service is available. However, as with the above "direct" solution with kernel extensions, this indirect method is a tedious solution for programmers.

Using kernel extensions until the services are provided within the based operating system provides an additional drawback. As noted above, a kernel extension must be available and should be loaded before any applications refer to the specific service. However, in order for the-base OS to support the new service, the system usually has to be restarted, leading to a halt (or disruption) to executing system services. For a load intensive computer system that is required to remain operational without such disruption (system downtime), providing OS support for these newer/updated services by restarting the system may be undesirable.

The present invention thus recognizes that it would be desirable to enable an application's reference to an undefined/unavailable OS service to be handled without causing a failure condition and/or system shutdown/reboot. The invention further recognizes that providing an enhanced OS that allows direct handling of undefined/unavailable OS services without requiring development and deployment of specialized kernel extensions (along with the associated kernel-loading applications) would be a welcomed improvement. These and other benefits are provided by the invention described herein.

SUMMARY OF THE INVENTION

Disclosed are a method and a computer program product that enable an existing operating system (OS) to provide a non-failure response to an application's reference to an OS service that is not currently defined/available within the existing OS. The loader of the OS responds to each reference to an undefined service by mapping the reference to a pre-defined unavailable service response utility (USRU). USRU is a specialized service designed to provide a response that a referenced service is not available or is undefined.

The OS loader is coded to provide this mapping to the USRU whenever a reference to an undefined service is received. When the OS loader detects that an application is referring to an OS service that is undefined, the OS loader resolves the reference to the USRU, which, when invoked returns an indication that the requested service is undefined.

Thus, the OS loader forces the resolution of an application's reference to an undefined service within the OS by triggering the USRU to provide the "not defined/not yet available" response. USRU may be written as a part of the base OS or provided as a separate value-added application to enhance the base OS.

The above as well as additional objectives, functions, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and a computer program product that enable an existing operating system (OS) to provide a non-failure response to an application's reference to an OS service that is not currently defined/available within the existing OS. The loader of the OS responds to each reference to an undefined service by mapping the reference to a pre-defined unavailable service response utility (USRU). USRU is a specialized service designed to provide a response that a referenced service is not available or is undefined.

The OS loader is coded to provide this mapping to the USRU whenever a reference to an undefined/unavailable service is received. When the OS loader detects that an application is referring to an OS service that is undefined/unavailable, the OS loader resolves the reference to the USRU, which, when invoked returns an indication that the requested service is undefined/unavailable.

Thus, the OS loader forces the resolution of an application's reference to an undefined service within the OS by triggering the USRU to provide the "not defined/not yet available" response. USRU may be written as a part of the base OS or provided as a separate value-added application to enhance the base OS.

As utilized herein, the term(s) undefined/unavailable, and similar terms, are generally utilized to refer to one or more of the following types of OS service:

(1) services that are new and therefore not available in the current release of the OS;

(2) services that have been updated to include additional features from the prior version of the service but whose newer versions are not yet available in the current version of the OS. (In one implementation, in addition to the USRU issuing a response to the application when a prior version of the service is available, the OS loader returns the prior version of the service to the application in a seamless manner); and (3) services that do not fall into either of the previous two categories but are just not supported/present within the current OS that is loaded on the computer system.

To maintain consistency throughout the description of the illustrative embodiments, all further references to a service that falls in one or more of the above categories are described as an undefined service.

Figure 1:
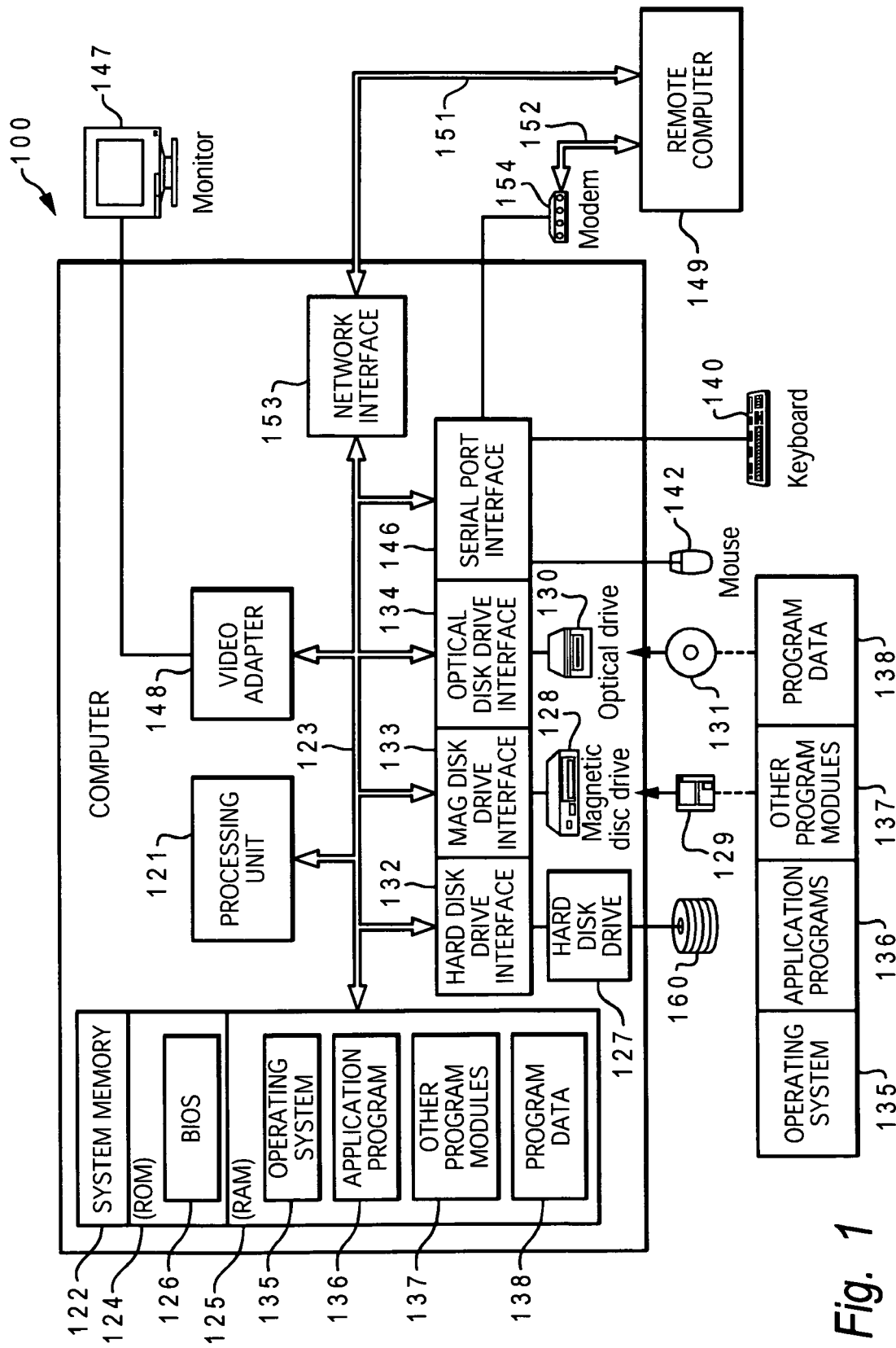
FIG. 1 is a block diagram illustrating the main components of a computer system within which the various embodiments of the present invention may advantageously be implemented.

With reference now to the figures, and in particular to FIG. 1, there is illustrated an exemplary computer system within which the functions of the invention may advantageously be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Computer system 100 includes a processing unit 121, system memory 122, and system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within the computer system 100, such as during start-up, is stored in ROM 124.

Computer system 100 further includes hard disk drive 127 for reading from and writing to hard disk 160, magnetic disk drive 128 for reading from or writing to removable magnetic disk 129, and optical disk drive 130 for reading from or writing to a removable optical disk 131 such as a CD ROM or other optical media. Hard disk drive 127, magnetic disk drive 128, and optical disk drive 130 are connected to system bus 123 by hard disk drive interface 132, magnetic disk drive interface 133, and optical disk drive interface 134, respectively. The drives and their associated computer-readable media provide nonvolatile storage of computer readable instructions, data structures, program modules and other data. Although the exemplary environment described herein employs hard disk 160, removable magnetic disk 129, and removable optical disk 131, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules are stored on the one or more of the above memory devices (i.e., hard disk 160, magnetic disk 129, optical disk 131, ROM 124 or RAM 125. Among these are base operating system (OS) 135, one or more application programs 136, other program modules 137, and program data 138.

For purposes of illustration, base OS 106 is described as a Windows-based operating system, such as Windows XP®, which is a trademark of Microsoft Corp. The functions of the invention are, however, applicable to any operating system that supports the enhanced OS loader and USRU functionality beyond the conventional OS loader. Thus, for example, the invention may also be implemented within a Linux-based OS. Other OSes which may implement the functionality of the invention available include Hewlett Packard's HP-UX®, IBM's AIX®, Sun's Solaris®, etc.

A user may enter commands and information into the computer system 100 through input devices such as keyboard 140 and graphical pointing device (mouse) 142. These input devices are often connected to CPU 121 through serial port interface 146 that is coupled to the system bus 123, but may be connected by other interfaces, such as a parallel port, game port or a universal serial bus (USB) or a network interface card. Monitor 147 or other type of display device is also connected to the system bus 123 via an interface, such as video adapter 148. In addition to monitor 147, computer system 100 may include other peripheral output devices (not shown), such as speakers and printers.

Computer system 100 may operate in a networked environment using logical connections to one or more remote computers, such as remote computer 149. Remote computer 149 may be another personal computer, a server, a router, a network PC, a peer device or other common network node. Depending on whether a wide are network (WAN) or local area network (LAN) is being accessed by computer system 100, the network access may be via modem 154 or network interface 153, respectively.

Finally, while computer system 100 is illustrated with specific hardware and software components, the invention is applicable to any type of computer system configuration so long as the background OS includes the enhanced file queuing options described herein. No structural or operational limitations are implied by the specific configuration and description thereof within the present specification.

Figure 2:
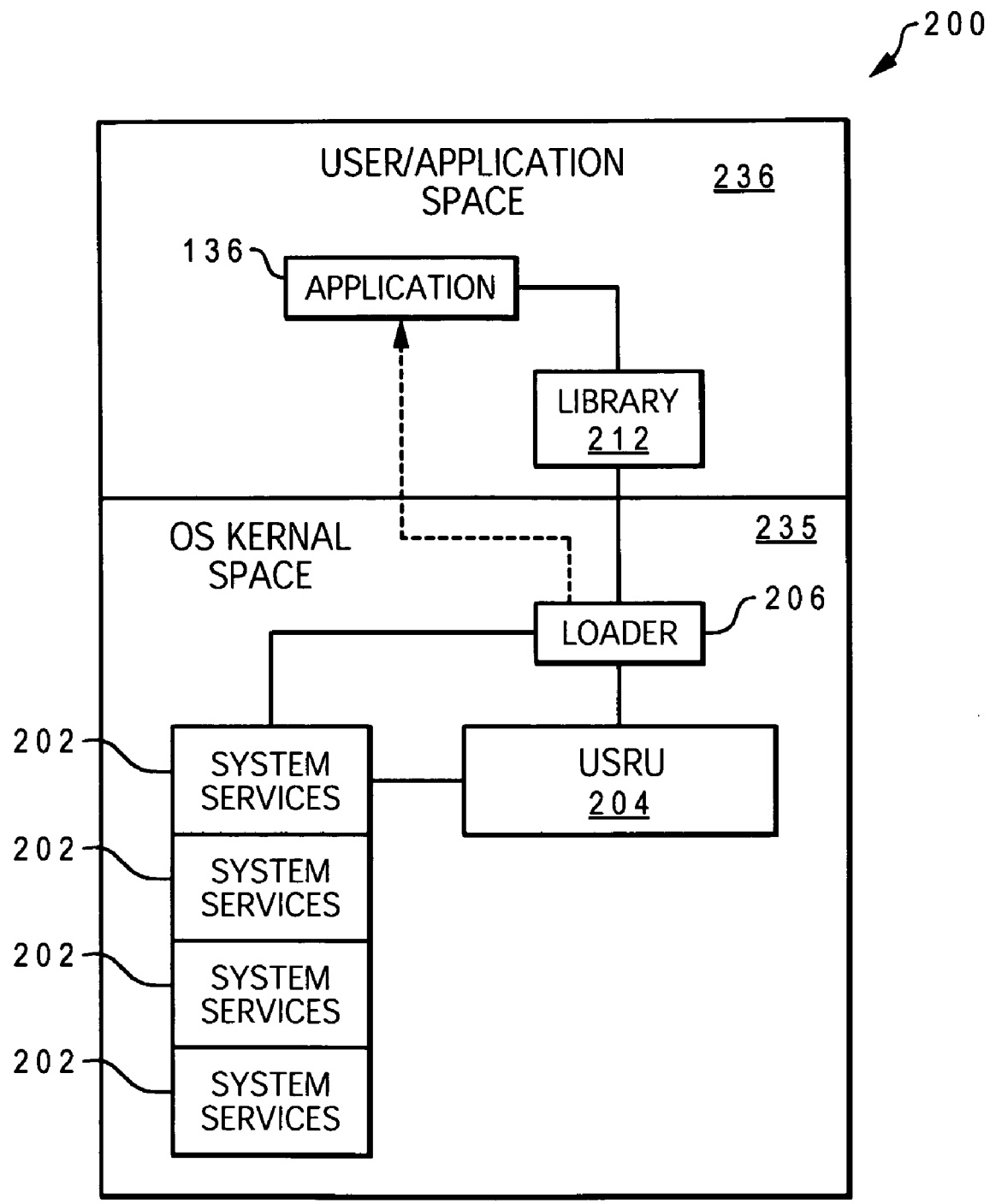
FIG. 2 is a block diagram representation of the key components of application space linked to those of OS kernel space, including USRU, according to one embodiment of the invention.

Turning now to FIG. 2, there is illustrated a block diagram layout representing an exemplary physical construct for OS kernel space and user/application space. Layout 200 includes OS kernel layer 235 having a plurality of OS services/functions 235 and an OS loader 206 located therein. User/application space 236 includes one or more application programs 136 and "shares" OS library 212 with OS kernel layer 235.

According to the illustrative embodiment of the invention, USRU 204 is also located within OS kernel space. USRU 204 is a specialized, pre-established service that handles a response to an application reference for a service that is undefined. USRU 204 has an address known to the OS loader. Both OS kernel layer 235 and user/application space 236 may include many other components. For example, OS kernel layer 235 may include a service for loading and unloading kernel extensions.

The functions of OS loader 206 include providing specific system services requested by an application within application space 236. Application space 236 contains at least one application program 210 that executes on computer system. During execution, application program 136 references services/functions 202 within OS kernel 235 via OS library 212. OS library 212 and OS loader 206 provide an interface between OS kernel space 235 and user/application space 236. References to specific services/functions found within the OS library 212 causes OS loader 206 to initiate a search for the associated function. According to the invention, when the referenced service is undefined, OS loader 206 completes a mapping of the reference for that service name to USRU 204. In one embodiment, the mapping is stored within OS loader, so future references to that service is automatically referred to USRU 204.

With the functionality provided by USRU and enhanced OS loader, applications are allowed to reference undefined services by directly invoking the USRU, without having to utilize/implement an indirect service look up scheme. USRU functionality further removes the requirement that the OS programmer/developer/provider develop and distribute multiple kernel extensions to provided temporary services until a newer version of the OS is made available with these new/unavailable services provided therein. Further, an application is able to reference new/unavailable services without restarting the OS to provide the service.

Specific program code may be provided to enable the OS to support the above-described functionality provided by the OS loader and USRU. While these features may be provided as a code within the base operating system, the invention contemplates providing these features, particularly those of USRU as a separate, add-on, OS update. This update may be provided as a one-time kernel extension that eliminates the need for future kernel extensions for new services. The update may be provided as a patch to the OS. Additionally, the add-on may be packaged separately from the OS and sold or distributed as a separate, licensed component.

Figure 3:
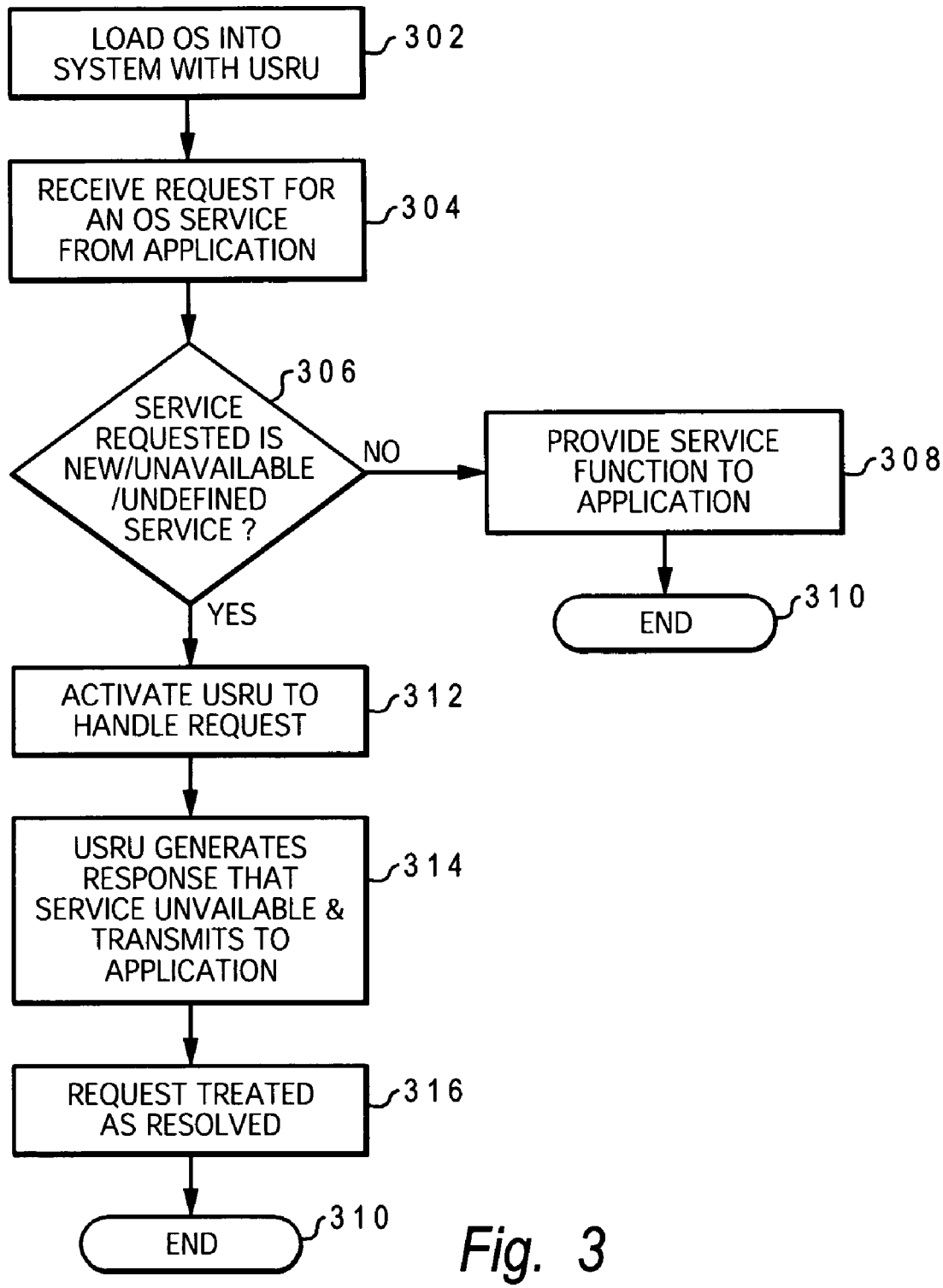
FIG. 3 is a flow chart illustrating the process by which an application's reference to an unavailable service is handled by the OS according to one embodiment of the invention.

With reference now to the flow chart of FIG. 3, there is illustrated a process by which an application's reference to an undefined service is handled by an OS. The process begins at block 302 at which the OS is loaded into the memory of the computer system along with a URSU. Then, a request for (or reference to) an OS service is received from an application at block 304. The reference is received by the OS loader, which determines at block 306 whether the reference is for an undefined service (i.e., not within the list of available OS services or kernel extensions thereof). When the service associated with the reference is an available service, the service functionality is provided to the application at block 308. Then the process ends at block 310.

From block 306, when the reference is for an undefined service, the OS loader generates a call to the USRU to handle the request, as shown at block 312. The OS loader is programmed to complete a mapping to the USRU whenever an application references a service within the OS library and the service is not defined and/or not available within the OS services. The OS loader creates a logical "bridge" between the reference for the service and USRU. The service name (used to reference the function) is stored by the OS loader along with the address of the USRU. Following the initial mapping, future references to the particular service from any application are automatically mapped to the USRU.

Returning to FIG. 3, the URSU receives the call from the OS loader and automatically generates a response that the service is unavailable at block 314. Transmission of the response to the application is handled similarly to a response to a reference that was successfully resolved (i.e., no failure condition registered), as indicated at block 316. The process then ends at block 310.

With USRU functionality, applications are allowed to reference undefined services by directly invoking the new service, without having to utilize an indirect service look up scheme. USRU functionality further removes the requirement that the OS developer/provider develop and manage multiple kernel extensions to provided temporary services until a newer/updated version of the OS, enhanced with these new/unavailable services, is loaded on the computer system. Further, an application is able to generate a reference to an undefined service without causing a system failure and/or restarting the OS. No specific kernel extension and associated extension-loading code is required.

The OS loader completes the mapping to the USRU whenever the library references a function that is undefined (within the currently available services). The OS loader creates a bridge linking the applications reference to the undefined function with the USRU. The OS loader receives the reference to the undefined function and rather than providing a failure message/response, the OS loader completes the link by mapping the reference (OS library entry) to the address/location of a defined service, the USRU. The application thus continues operating. In one implementation, the application may check to see if the function is available and if not, the application keeps running using the older/limited version of the function, as if the reference was resolved.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   detecting a reference by an application for an operating system (OS) service that is currently undefined by the OS or currently unavailable within the OS, said detecting including:
      checking a list of available OS services when the reference is detected;
      checking for OS kernel extensions that may be associated with the reference; and
      providing access to the OS service when a service is found within the list of available OS services or the OS kernel extensions;
   resolving the reference by:
   (a) issuing a call to an Undefined Service Response Utility (USRU) executing on a processor of the data processing system and which automatically returns a response to the application indicating that the OS service is not currently available within the OS and which triggers a status of the reference as resolved, wherein the USRU utility is a separate functional component from an application programming interface associated with the OS; and
   (b) returning to the application a message indicating that the referenced OS service is not currently available within the OS and OS kernel extension; and
   (c) enabling the application to continue processing beyond the reference, with the message accepted as a response to the reference, such that the forward progress of the application continues even when the referenced OS service is unavailable or not yet defined;
   mapping the reference for the OS service to the USRU, wherein future references to said OS service are automatically sent to the USRU until an OS update occurs;
      recording the mapping of the reference; and
   in response to a receipt of a subsequent reference for that OS service while the OS service remains undefined or unavailable, automatically responding via the USRU to the subsequent reference for the OS service, whereby the USRU provides the application with a response indicating that the requested OS service is not yet available;
   whereby non-availability of the requested OS service does not result in one or more of a failure condition, a system shutdown, or a system reboot.

2. A computer system comprising:
   a memory having stored thereon an Operating System (OS) with OS kernel having an OS loader and library; and one or more application programs;
   a processor coupled to the memory and utilized for executing code of the application programs and functions of the OS;
   wherein the OS loader includes program logic that when executed by the processor provides the functions for:
      detecting a reference by an application for an OS service that is currently undefined by the OS or currently unavailable within the OS; and
      checking a list of available OS services when the reference is detected;
      checking for OS kernel extensions that may be associated with the reference;
      providing access to the OS service when a service is found within the list of available OS services or the OS kernel extensions;
   resolving the reference by:
      issuing a call to an Undefined Service Response Utility (USRU) executing on a processor of the data processing system and which automatically returns a response to the application indicating that the OS service is not currently available within the OS and which triggers a status of the reference as resolved, wherein the USRU utility is a separate functional component from an application programming interface associated with the OS;
      returning to the application a message indicating that the referenced OS service is not currently available within the OS and OS kernel extension; and
      enabling the application to proceed processing beyond the reference with the message accepted as a response to the reference such that the forward progress of the application continues even when the referenced OS service is unavailable or not yet defined;
      mapping the reference for the OS service to the USRU, wherein future references to said OS service are automatically sent to the USRU until an OS update occurs;
      recording the mapping; and
   in response to a receipt of a subsequent reference for that OS service while the OS service remains undefined or unavailable, automatically responding via the USRU to the subsequent reference for the OS service, whereby the USRU provides the application with a response indicating that the requested OS service is not yet available;
   whereby non-availability of the requested OS service does not result in one or more of a failure condition, a system shutdown or a system reboot.

3. A computer program product comprising:
   a computer readable storage medium; and
   program code on said computer readable storage medium that when executed by a processor provides the operating system (OS) functions for:
      detecting a reference by an application for an OS service that is currently undefined by the OS;
      checking a list of available OS services when the reference is detected;
      checking for OS kernel extensions that may be associated with the reference; and
      providing access to the OS service when a service is found within the list of available OS services or the OS kernel extensions;
   resolving the reference by:
      issuing a call to a Undefined Service Response Utility (USRU), which automatically returns a response to the application indicating that the OS service is not currently available within the OS and which triggers a status of the reference as resolved;
      returning to the application a message indicating that the referenced OS service is not currently available within the OS and OS kernel extension; and
      enabling the application to proceed processing beyond the reference with the message accepted as a response to the reference such that the forward progress of the application continues even when the referenced OS service is unavailable or not yet defined;
mapping the reference for the OS service to the USRU, wherein future references to said OS service are automatically sent to the USRU until an OS update occurs;
recording the mapping; and
in response to a receipt of a subsequent reference for that OS service while the OS service remains undefined or unavailable, automatically responding via the USRU to the subsequent reference for the OS service, whereby the USRU provides the application with a response indicating that the requested OS service is not yet available;
whereby non-availability of the requested OS service does not result in one or more of a failure condition, a system shutdown or a system reboot.

* * * * *